United States Patent [19]

Jacobson

[11] 4,264,838
[45] Apr. 28, 1981

[54] FORCE BALANCED PIEZOELECTRIC VIBRATORY RATE SENSOR

[75] Inventor: Peter E. Jacobson, Phoenix, Ariz.

[73] Assignee: Sperry Corporation, New York, N.Y.

[21] Appl. No.: 80,757

[22] Filed: Oct. 1, 1979

[51] Int. Cl.³ .............................................. H01L 41/08
[52] U.S. Cl. ..................................... 310/329; 310/321; 310/314; 73/505
[58] Field of Search ............................... 310/328–332, 310/367, 366, 321, 314; 73/505, 517 R, 517 B, 517 AV; 33/351, 360

[56] References Cited

U.S. PATENT DOCUMENTS

| | | | |
|---|---|---|---|
| 2,309,853 | 2/1943 | Lyman et al. | 73/505 |
| 2,513,340 | 7/1950 | Lyman | 73/505 |
| 2,683,247 | 7/1954 | Wiley | 73/505 X |
| 3,924,475 | 12/1975 | Stiles | 73/505 X |
| 4,079,630 | 3/1978 | Friedland et al. | 73/505 |
| 4,157,041 | 6/1979 | Loper, Jr. et al. | 73/505 |
| 4,186,324 | 1/1980 | Hartzell, Jr. | 310/329 |
| 4,197,478 | 4/1980 | Silvus, Jr. | 310/329 X |

Primary Examiner—Mark O. Budd
Attorney, Agent, or Firm—Howard P. Terry

[57] ABSTRACT

The present invention is an inertial rate of turn sensor of the vibratory type employing force feed back techniques for maintaining the free end of a cantilever in a nulled lineal path, constant with respect to the casing of the instrument. The current required to maintain the constant lineal path is then a measure of the amplitude of the rate of turn of the case and the phase sense of that current defines the sense of rotation of the case and therefor of the craft.

10 Claims, 5 Drawing Figures

FORCE BALANCED PIEZOELECTRIC VIBRATORY RATE SENSOR

The invention herein described was made in the course of or under a subcontract with the United States Department of the Navy.

BACKGROUND OF THE INVENTION

1. Field of the Invention

The present invention relates to inertial rate sensors and more particularly to vibratory rate of turn devices, particularly for aircraft or other maneuverable vehicles, employing force feed back or self-nulling techniques for maintaining motion of the vibratory element in a predetermined plane, the force so required being proportional to a turn rate tending to cause vibration out of that plane.

2. Background of the Invention

The principal examples of prior art vibratory rate of turn devices for craft stabilization and navigation purposes are found in the J. Lyman, E. Norden U.S. Reissue Pat. No. 22,409, dated Dec. 21, 1943 and assigned to Sperry Rand Corporation, a reissue of the U.S. Pat. No. 2,309,853, originally issued Feb. 21, 1943. The present invention is a basic improvement over various embodiments of the reissue patent, all of which operate in an open-loop manner and therefore are subject to the inconsistancies and errors associated with most open loop types of sensors, such as drift, scale factor change, temperature sensitivity, output signal non-linearity, et cetera. The present invention utilizes closed loop techniques and embodies the known characteristics of piezoelectric devices for imparting vibration forces to the sensing element. However, in its broadest aspects, the present invention is applicable to the general class of vibratory sensing devices.

In general with respect to such piezoelectric transducers, operation is based upon electrical-charge, mechanical-strain phenomenon in the material, usually referred to in terms of coupling coefficients, when vibrated to develop linear momentum in a sensory mass. In open loop sensors which use the high resolution of this energy conversion mechanism, the drift and scale factor characteristics are directly dependent upon the stability and characteristics of the piezoelectric material coupling coefficient. Thus, use of such transducers in inertial instruments has been hampered by drift in stability and scale factor, only to be overcome to a degree in the past by intensive development of more stable piezoelectric materials. But other troublesome areas have also been recognized and overcome by the present invention; these include the need to reduce cross-coupling effects at zero rate of turn, temperature sensitivity, nodal point mislocation effects, non-symmetrical motion of the sensor, and electrode non-symmetries.

SUMMARY OF THE INVENTION

The present invention is a closed loop inertial rate of turn sensor of the vibratory type employing force feed back techniques; it includes an elongate rod or beam cantilevered on an integral support position, the latter being driven in one direction to cause vibrations of the free end of the beam in a preferred plane, and a pick off device to sense components of the vibration out of said plane produced by Coriolis effects when the integral support portion is subjected to a turn rate about the nominal axis of the beam and being driven in an orthogonal direction at the beam resonance frequency to force the beam vibrations back into the preferred plane, the latter drive current being proportional to the rate of turn.

DESCRIPTION OF THE PREFERRED EMBODIMENTS

Figure 1:
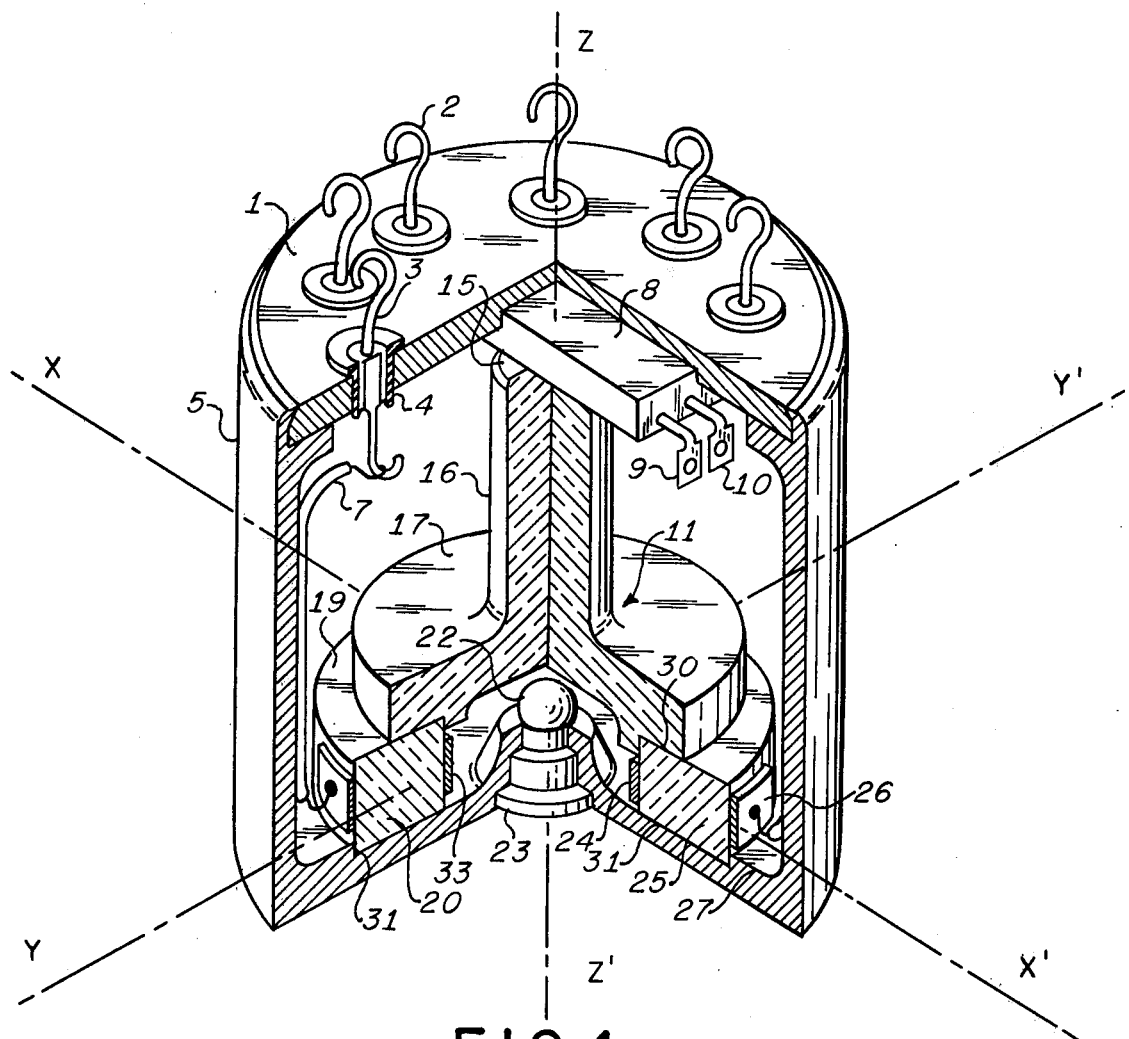
FIG. 1 is a perspective view, partly in cross section, of the physical aspects of one form of the invention.

In FIG. 1, the invention employs a vibratable element composed of a round beam or rod 16, acting as a beam-mass element integrally supported in cantilever fashion at the center 11 of a circular disc-like portion 17 which may serve as a base, the rod and the disc portion being fabricated integrally from suitable light-transmitting, high-strength material such as amorphous molded glass. Such glass materials are homogeneous and isotropic and do not display in the present application the undesired characteristics of polycrystalline materials that would engender non-symmetric motion of the transducer, excessive internal damping, and undesired input-output cross-coupling. Operation of beam or rod portion 16 will be described in terms of a pair of mutually perpendicular axes XX', YY' normal to the at rest axis of symmetry of rod portion 16. The simple geometry lends itself well to precise manufacturing control and that fact, together with the homogeneous nature of the glass, reduces phasing, temperature, and damping problems. The axis of symmetry of rod portion 16, when the device is totally at rest, normally coincides with the ZZ' axis about which rates of turn are ultimately to be measured.

The associated disc portion 17 of the vibratile element is affixed to a flat end portion 27 of a hollow cylindrical case 5 for the instrument or to other support means through a plurality of diametrically opposed piezoelectric drivers excited by controlled alternating current, each driver demonstrating electrically expandable and contractable thickness in accordance with its excitation. Case 5 may be filled with a neutral gas such as nitrogen. As in FIGS. 1 and 1A, four quadrantally paired piezoelectric actuators may be employed, as illustrated, for example, by the two actuators 20 and 25 in FIG. 1. It will be understood that axis ZZ' may be oriented in any desired manner but preferably along the craft axis about which rates of turn to be measured. Also, the casing is not necessarily a closed one, although in most practical applications, it will be closed to protect the delicate elements from contamination.

Figure 1A:
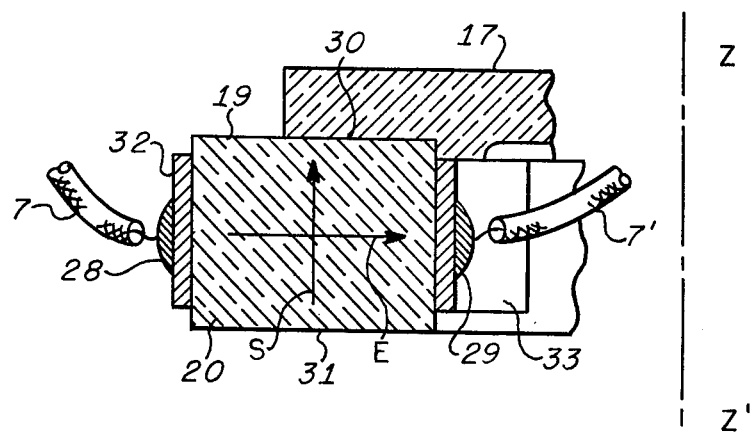
FIG. 1A is a cross section view or an enlarged scale of a portion of FIG. 1.
Figure 2:
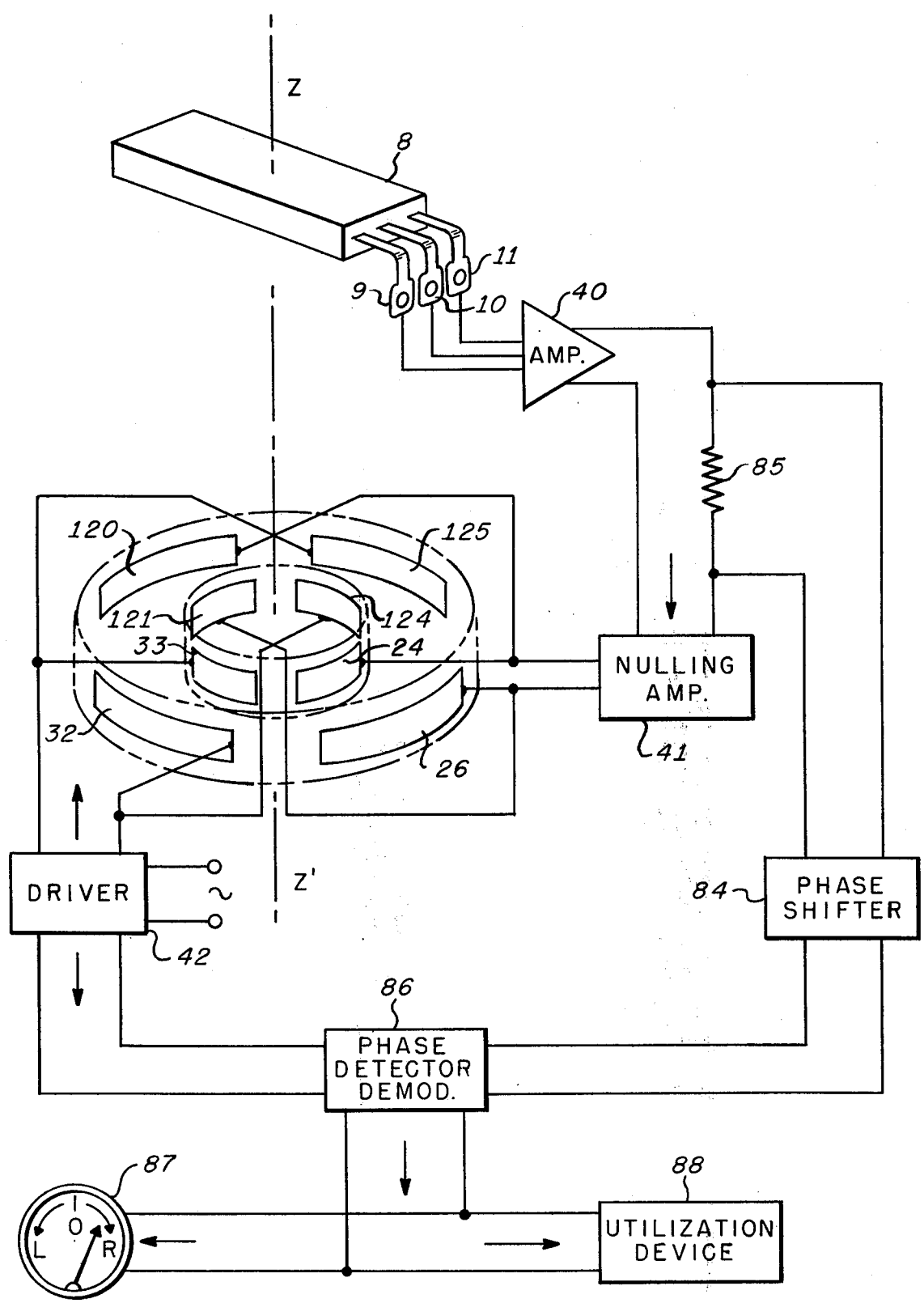
FIG. 2 is a diagram showing electrical parts of the invention and interconnections thereof.

Referring particularly to FIG. 1A, a driving voltage for actuator 20 may be coupled from driver 42 by leads 7, 7', whose conductors are ohmically connected at 28, 29 to respective electrodes 32, 33 on radially opposed sides of a polarized, piezoelectric, flat, centrally-apertured ring 19. The electrodes 32, 33 are located at the transverse strain plane so that errors contributed by electrical conductors and by any lack of electrical symmetry are minimized. Application of an appropriate electric field indicated by arrow E across the material between electrodes 32, 33 will cause the polarized piezoelectric material to expand when threaded by the electric charge field, as indicated by arrow S. The expander actuator 20 associated with electrodes 32, 33 is thus caused to provide local expansion, lifting one part of disc 17 in the sense of arrow S and consequently tilting disc 17. The face 15 of the vibratile rod 16 accordingly moves toward the Y' end of axis YY'. To perfect such operation, the piezoelectric material of ring 19 may be affixed by a suitable adhesive material at interface 31 to a flat portion 27 of the instrument casing, while a similar adhesive is used at interface 30 to fasten disc portion 17 and ring 19 together in a hinge-like manner. The second actuator 25 seen in FIG. 1 and the other two actuators not seen in FIG. 1 but indicated in FIG. 2 schematically by their coupling electrode plates at 120, 121 and 124, 125 are similarly constructed. In general, they are formed by methods well established in the art, such as described, for example, in pages 287 to 294 of the third edition of *Radio Engineering Handbook*, Keith Henney, McGraw-Hill Book Company, New York, 1941 and elsewhere. While many materials exhibit piezoelectric properties, it is preferred to use materials such as lead titanate zirconate compositions in view of the fact that they demonstrate high electromechanical coupling, temperature stability, and relatively slow aging. It will be understood that the actuators associated with electrode plates 32, 33 and 124, 125 cooperate in a push-pull mode to force the vibrating elements 16, 17 into vibration at the resonant frequency of the beam-mass element 16; the actuators associated with electrode plates 24, 26 and 120, 121 cooperate for a second purpose yet to be described.

Referring again to FIG. 1, input and output signals may be conveyed through sealed conductors in the flat end portion 1 of instrument casing 5, such as by conductors 2, 3. For example, the electrode 32 of actuator 20 is seen to be coupled via electrical lead 7 through seal 4 to external terminal 3; electrode 33 may be similarly coupled via a lead that is not shown in FIG. 1, but is connected to external terminal 2.

Figure 3:
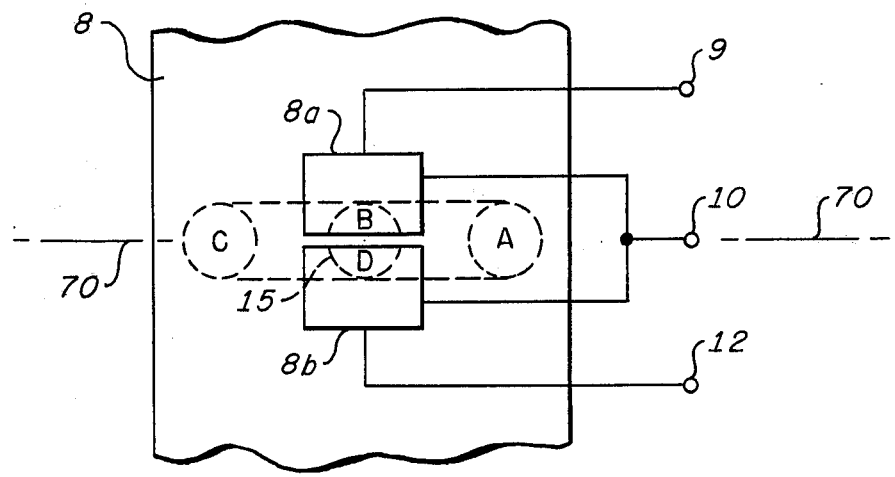
FIG. 3 is a top view of a portion of the photoelectric sensor of FIG. 1.

An electro-optic pick off is provided for detecting any small motion of the circular face 15 of vibratile rod 16 along the XX' axis, it being driven in the plane of the YY' axis by actuator 20 and its opposite companion actuator associated with electrodes 124, 125. For this purpose, there is disposed on the ZZ' axis of the device a suitable light source 22 fixed in a socket 23 disposed in a suitable bore in the end plate 27 of the instrument casing 5. Light projected from a lamp or luminous diode 22 is projected into the transparent glass rod portion 16, which rod portion acts in a conventional manner as a light collimator and guide. If the free end of rod 16 were to move cyclically in the XX' plane, a spot of light exiting face 15 of rod 16 would in effect scan back and forth in the XX' plane as seen in FIG. 3.

The invention, without the use of actuator 25 and its opposed companion actuator, would operate in a manner generally similar to that of the aforementioned Lyman et al device. In other words, (referring to FIG. 3), when the end 27 is not subjected to turning forces; i.e., there being no rotation about axis ZZ' as a consequence of rotation of the craft upon which it is mounted, and when push-pull driving sinusoidal voltage waves are applied to the electrode pairs 32, 33 and 124, 125, the upper face 15 of vibratile rod portion 16 sweeps past the face of optical pick-off 8 in a regular cyclic manner at the frequency of the driving or forcing voltage and as shown at 71 in FIG. 4. Instantaneously, the face 15 appears in FIG. 3 in this circumstance at A, then B, then C, then D, the cycle continuously repeating. Since the device is not turning about axis ZZ', the vibration of end face 15 is a consequence of the cantilevered vibration of rod portion 16 induced by the alternating push-pull expansions of the driving actuators is symmetric and lineal and generally lies in the plane 70 including axes ZZ' and YY'. The two photodetectors 8a, 8b are disposed symmetrically on each side of plane 70; since they both intercept the same amount of light when there is no rotation rate about axis ZZ', there is no consequent output at terminal pairs 9, 10 and 10, 11. The frequency of the forcing or driving voltage from driver 42 is selected to be the same as the mechanically resonant frequency of the glass beam mass-spring system so that a predetermined maximum excursion of the free end 15 of the beam portion 16 is efficiently achieved. Those skilled in the art will recognize that other means of driving beam 16 are readily substitutable, including the self-resonant driving system of the aforementioned Lyman et al patent.

Figure 4:
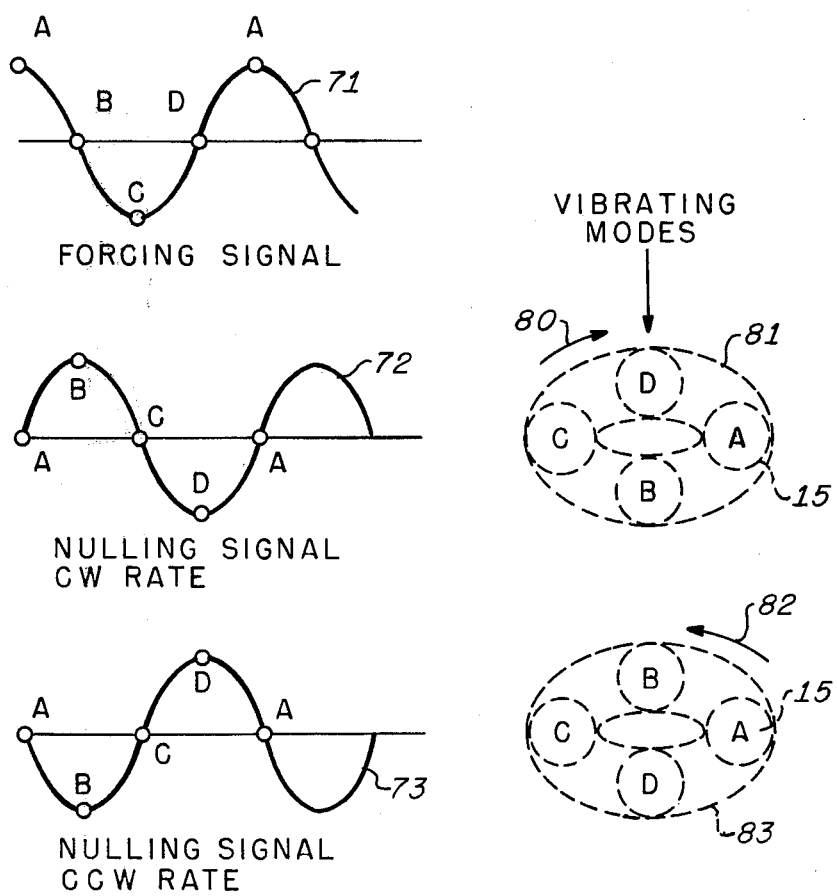
FIG. 4 relates electrical wave forms and possible paths of the free end of the vibrating element for purposes of explaining the operation of the invention.

Without other influences intervening, the lineal excursion of end face 15 are modified in the manner described by Lyman et al so as to display the two distinct vibrating modes of FIG. 4 whenever the device is rotated about axis Z'. Should such rotation about axis ZZ' be clock-wise, for example, Coriolis-induced forces come into play, especially increasing in amplitude toward the mid-position of the free end 15 of beam 16 where the mass linear momentum is a maximum. These forces induce vibrating bending and motion of rod portion 16 at right angles to the motion shown in FIG. 3 at the forcing frequency and relatively phased so that the end face 15 of rod 16 moves in the sense of arrow 80 from A to B, to C, to D and thereafter continues to move in the cyclic elliptical path 81 as long as a component of rotation of casing element 27 about axis ZZ' continues. Should turning of the craft and case portion 27 be reversed to become counter-clockwise, but still at the same rate, the elliptical path 83 having minor and major axes equal to those of ellipse 81 is followed, but now the path is traversed in the opposite direction as indicated by arrow 82. The output of the photodetector pair 8a, 8b is essentially sinusoidal at the frequency of the driving voltage 71 and is phase shifted 90° from this signal. The actual sense of rotation about axis ZZ' is contained in the phase of the photodetector output, while the magnitude of the turning rate is proportional to the dimension of the minor axis of the ellipse on to the amplitude of the sinusoidal voltage between terminals 9, 12.

The variable phase, variable magnitude output of the photocell pair 8a, 8b produced when the craft turns is amplified by an amplifier 40, if desired, and is then supplied to a buffer push-pull amplifier 41. The resultant push-pull a.c. output of amplifier 41 is applied to the coupling electrodes 24, 26 of actuator 25 as seen in FIGS. 1 and 2 and in a phase such as to tend to produce a vibration of the rod end 15 in the XX' plane which counters the vibration in this plane produced by the Coriolis effect. The consequence is that the motion of the rod end 15 in the elliptical path is suppressed and the rod vibration is driven back into the preferred plane 70 of FIG. 3. For the purpose of providing a high gain symmetrically balanced restoring action, a similar actuator is disposed diametrically opposite actuator 25, as is suggested by the electrode pair 120, 121 of FIG. 2, and these electrodes are also driven so as to cooperate with actuator 25 thereby preventing the elliptical motion. As will be appreciated by those skilled in the art, conventional gain adjustments may be made so that the forces exerted by actuator 25 and its companion associated with electrodes 120, 121 in response to the pick off signal are made precisely equal and opposite to any Coriolis forces produced by craft turning about axis ZZ', thus maintaining the vibration of beam 16 in the YY', ZZ' plane, such restoring forces being proportional to turn-induced Coriolis forces. The cantilevered beam or rod end 15 is accordingly position nulled. Material instabilities, if moderate, are not added into the output signal nor are thermally induced non-linearities which may be present in the piezoelectric material, since they effect both beam drive and nulling equally. When the balanced nulled state obtains, the demodulated output of amplifier 40 is proportional to rate of turn and its polarity represents turn direction. In this manner, the voltage drop across resistor 85 is directly representative of rate of turn, while the phase of that voltage drop corresponds to the direction of turn.

The variable bipolar output voltage across resistor 85 is phase shifted 90° by the conventional phase shifter 84 and is coupled to one set of inputs of a conventional phase detector or demodulator 86, whose second set of inputs is responsive to driver 42 and whose output is used in detector 86 as a reference phase and frequency signal. Detector 86 provides a bipolar, variable magnitude signal whose amplitude is a measure of rate of turn and whose sign represents the direction of turning of the craft about the ZZ' axis of the instrument. Such a signal may be used to actuate a zero center left-right meter such as meter 87. Further, it may be used for automatic aircraft stabilization and control purposes, as indicated by utilization device 88.

Accordingly, it is seen that the invention is an inertial rate of turn sensor of the driven vibratory type improved by the provision of a force feed back arrangement for maintaining the locus of the free end of the vibratory cantilever rod in a preferred plane of vibration, the force required being proportional to the rate of turn of the instrument about the nominal rod axis. The force feed back signals tend substantially to prevent the lineal path of the rod end from opening into an ellipse when the instrument is subjected to turning. In this manner, the demodulated current required to prevent formation of the elliptical path is a direct measure of the amplitude of rate of turn of the case of the instrument and of the craft upon which it is mounted. The sense of turn is defined by the positive or negative sense of the coercing or feed back current.

The vibratory rod displacement amplitude as well as the restoring current as it is forced to follow a lineal or nulled path are both dependent on the coupling coefficient of the piezoelectric material, so that instabilities located in the materials are not added to the output signal and temperature non-linearities of the piezoelectric material can not influence scale factor or linearity. Polycrystalline ceramics are avoided through the use of a glass vibratory element which, being amorphous, promotes absolute material symmetry and freedom from cross-coupling between the input and output vibratory modes. Non-symmetric motion and phase errors of the beam are avoided. The time-hysteresis damping characteristic of glass provides stability of the vibratory beam.

The vibration nodal plane of the vibratory rod is established well within the rigid disc-shaped portion of the elastic member so that it will remain fixed in location. The simple shape of the total vibratory element lends itself to high tolerance control and minimum non-linearity due to non-homogeniety. The voltage gain of the photodetector is a function of temperature and the light intensity emitted by the aging lamp does not produce significant error because of the force nulling of the vibratory rod and path. Size, weight, ruggedness, cost, and life duration are all additionally favorable.

While the invention has been described in its preferred embodiments, it is understood that the words which have been used are words of description rather than of limitation and that changes may be made within the purview of the appended claims without departing from the true scope and spirit of the invention in its broader aspects.

What is claimed is:

1. A force feed back vibratory inertial rate of turn sensor device comprising:
   at least one elongated vibratile element supported at one end with respect to a case member with the free end of said element extending in the direction of sensing axis about which rate is to be measured,
   first drive means coupled between said element and said case member for vibrating the free end of said element in a first plane including said sensing axis at a frequency dependent upon the natural vibration frequency of said element,
   signal generating means coupled between said case member and said free end of said vibratile member for providing a signal dependent upon a component of said element vibration in a second plane normal to said first plane due to rotation of said case member about said sensing axis, and
   second drive means coupled between the supported end of said element and said case member and responsive to said signal for vibrating said element in said second plane in a sense to reduce said signal to zero, whereby the signal supplied to said second drive means is proportional to said rate of turn of said case member about said sensing axis.

2. Apparatus as described in claim 1 wherein said vibratile element includes a single beam portion cantilevered from said case member and extending along the sensing axis, wherein said first drive means vibrates the free end of said beam portion in said first plane at its natural vibration frequency and wherein said signal generating means is coupled with said free end of said beam and responsive to a component of vibration thereof in said normal plane.

3. Apparatus as described in claim 2 wherein said first and second drive means comprise orthogonally disposed piezoelectric means coupled between said cantilevered end and said case member for driving said beam portion in said first and second planes, respectively.

4. Apparatus as described in claim 3 wherein said beam element is fabricated from light transmitting material and wherein said signal generating means comprises a light source coupled through said element and photoelectric means responsive to light transmitted through said material.

5. Apparatus as described in claim 4 wherein:

said vibratile element additionally includes a substantially radially enlarged base portion adjacent said case member and integral with said beam portion, said first drive means comprises a first diametrically disposed pair of piezoelectric drivers in said first plane, said second drive means comprises a second diametrically disposed pair of piezoelectric drivers in said second plane, said first and second pairs of piezoelectric drivers being fixedly attached to said case means and to said radially enlarged base portion.

6. A force feed back vibratory inertial rate sensor for sensing rates of rotation about a sensing axis comprising:

a symmetric elongated flexible vibratable rod element extending along said sensing axis and having a free end and a support end, a radially enlarged base portion integral with said rod support end, first electrically actuated means coupled with said enlarged base portion for cyclically tilting the same in a first direction whereby said free end cyclically traverses a substantially lineal path in said first direction, generator means for detecting cyclic motion of said free end transversely of said lineal path in response to rates of rotation of said sensor about said sensing axis, second electrically actuated means coupled with said enlarged base portion and responsive to said generator means for forcing the transverse motion of said free end to return to said lineal path, and utilization means additionally responsive to said generator means for providing an output proportional to said forcing motion.

7. Apparatus as described in claim 6 wherein said vibratable rod and said enlarged portion are formed integrally of amorphous glass.

8. Apparatus as described in claim 7 wherein said generator means comprises:

light source means for projecting light centrally through said rod element, said rod element serving as a light guide, and optical generator means disposed to detect any transverse motion of the free end of said rod element.

9. Apparatus as described in claim 1 additionally including amplifier means responsive to said generator means, said second drive means being responsive to said amplifier means.

10. Apparatus as described in claim 9 further including phase detector means response to first electrically actuated means and to said signal generating means for producing a bipolar output representing the polarity and magnitude of rate of turn of said sensor apparatus about said sensing axis.

* * * * *